Dec. 26, 1939.   L. R. ADAMS   2,184,373
STORAGE BATTERY
Filed Aug. 27, 1936
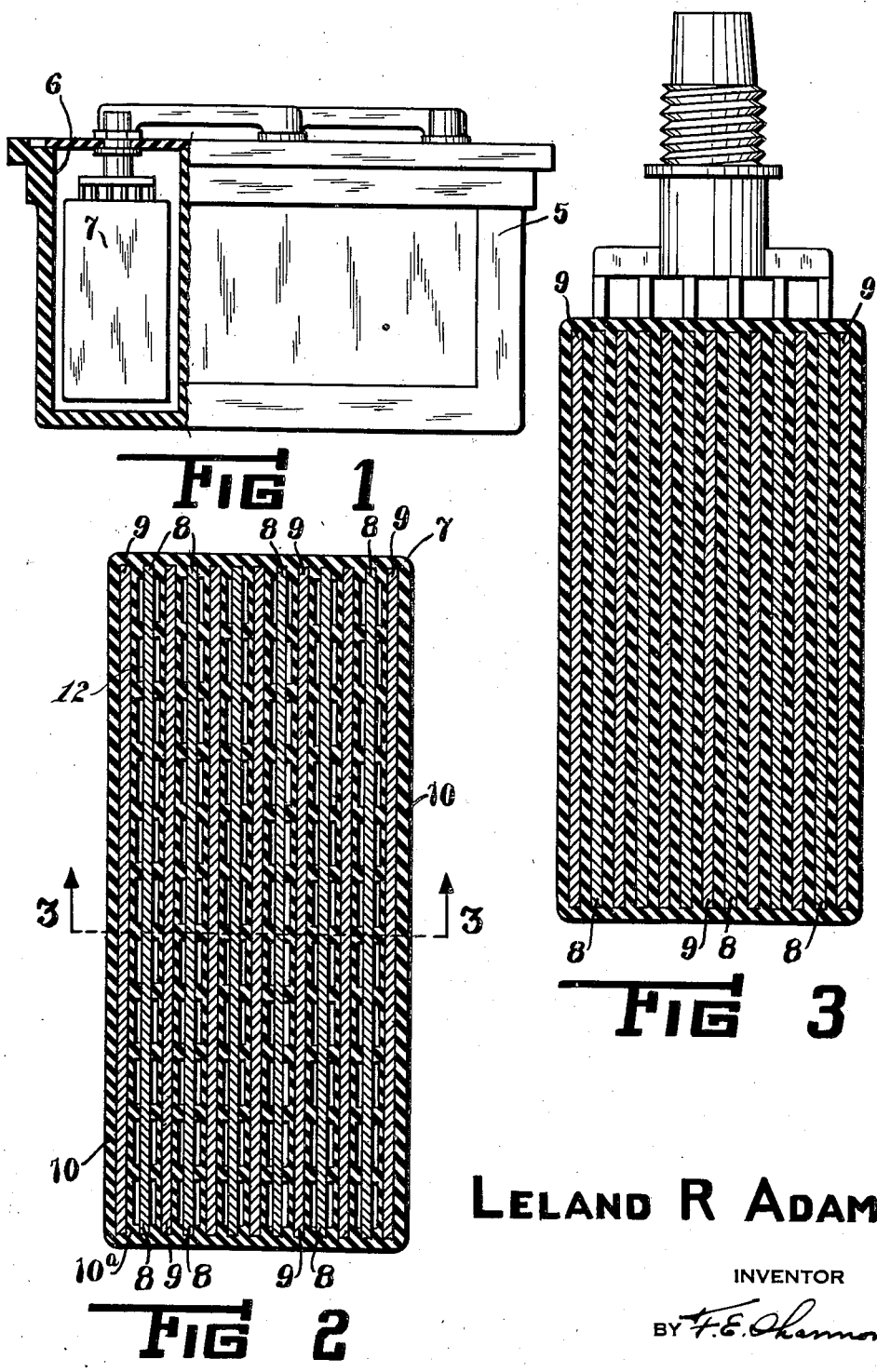
LELAND R ADAMS
INVENTOR
BY F. E. Shannon
ATTORNEY Patented Dec. 26, 1939

2,184,373

UNITED STATES PATENT OFFICE 2,184,373

STORAGE BATTERY

Leland R. Adams, Akron, Ohio

Application August 27, 1936, Serial No. 98,163

3 Claims. (Cl. 136—147)

This invention relates to improvements in storage batteries.

In storage batteries of ordinary construction, the positive and negative plates of each cell are separated by individual insulating elements which are composed of wood, rubber or other suitable dielectric material. The plates and separators must be assembled by hand labor and when assembled are held in assembled relation by frictional contact. This process of assembly is slow and in many instances, one or more of the separators become cracked or broken in the process of assembly.

Objects of this invention are to provide a storage battery in which a unitary, insulating element completely surrounds the entire cell, extends around each plate and between the adjacent plates to efficiently insulate said plates and permanently hold the same in proper spaced relation.

Other objects are to provide a battery cell which can be more conveniently and economically constructed; which can be more conveniently handled and which will be more durable and efficient than battery cells of ordinary construction.

In the drawing there is shown an illustrative embodiment of the invention, it being understood that the invention is not confined to the particular form illustrated and that changes and substitutions may be made which come within the scope of the appended claims.

Figure 1 is a side elevational view of a battery constructed in accordance with this invention, parts being broken away and shown in vertical section, Figure 2 is a horizontal, sectional view of the plates and spacers forming each battery cell, Figure 3 is a vertical, sectional view of same taken as indicated by the lines 3—3 of Figure 2.

The invention will now be described with reference to the particular adaptation thereof disclosed in the drawing in which the numeral 5 is used to denote a three cell storage battery which includes a suitable casing having a cell cavity 6, in which is suitably mounted a battery cell 7. The cell 7 is composed of the usual positive and negative plates 8 and 9 which is enclosed in a block of electrically, non-conductive, porous material 10 which extends completely around each plate and provides separators 10a between the plates and a covering for the entire cell 7. Each separator layer 10a is provided on the side adjacent the positive plate 8 with a laterally extending series of spaced, vertical grooves which extend entirely therethrough thereby forming the vertical passages 12 on each side of each positive plate whereby the electrolyte in the battery cell may be more readily brought into intimate contact with each positive plate.

It is understood that the block 10 may be formed of any suitable material, but I prefer to form the same of the well known porous rubber composition now employed in forming battery separator plates.

In forming my improved cell 7, the positive and negative plates 8 and 9 are assembled. Suitable strips (not shown) having a cross sectional contour conforming to the shape of the passages 12 are secured flat against each side of each positive plate 8. The group is positioned in a suitable mold and the mold is filled with a liquid rubber compound mixed to provide the necessary porosity. The rubber is then congealed and vulcanized to provide a solid rubber block in which the plates 8 and 9 are embedded. The above described strips are then removed leaving the passageways 12 which extend along each side of each positive plate.

While I have shown and described a block 10 composed of a rubber composition, any suitable composite material or substance may be employed informing the block 10 and the block 10 molded or otherwise formed to provide the connected separator plates 10a.

The term "rubber composition" used in the claims shall include compositions made with rubber, artificial rubber or any suitable material of a similar character. Glass or other electrically non-conductive material may be employed or used as a filler in the composition forming the block 10 and the composition may be placed on the grouped positive and negative plates while the same are in a charged or uncharged condition. It will be seen that the grouped plates covered and separated with dielectric material as herein set forth can be more readily and conveniently handled and that the plates forming the group will be firmly held in an operative position and that the separator plates cannot be displaced.

It will also be seen that as the above described structure employs dielectric separator plates 10a which are molded directly on the grouped plates 8 and 9 thereby materially reducing the cost of assembly and that the same can be more conveniently and economically manufactured than batteries of ordinary construction.

Having thus illustrated my invention and described the same in detail, what I claim as new and desire to secure by Letters Patent is:

1. In a storage battery, positive and negative plates, a unitary porous insulating element molded around said plates and extending therebetween, said element provided with parallel, elongated passageways which extend vertically therethrough only along each side of each positive plate.

2. In a storage battery cell, spaced positive and negative plates, porous dielectric material surrounding said plates and interposed therebetween, said insulating material completely enclosing each negative plate and provided with vertical openings which extend therethrough on each side of each positive plate.

3. In a storage battery, spaced positive and negative plates, a unitary insulating element composed of a porous rubber composition extending between said plates to hold the same in spaced relation, said element completely enclosing the negative plates and provided with passageways along the positive plates.

LELAND R. ADAMS.